(12) United States Patent
Feldman et al.

(10) Patent No.: US 10,362,178 B2
(45) Date of Patent: Jul. 23, 2019

(54) METHOD AND SYSTEM FOR LEAST COST ROUTING (LCR) OF INTERNATIONAL MOBILE TELEPHONE CALLS WITH AN INTEGRATED MONEY TRANSFER FACILITY

(71) Applicants: Victoria Feldman, Moshav Hagor (IL); Slavek Fitinbiviesky, Cracow (PL); Yossi Avraham, Petach Tikva (IL); Alex Pritsert, Haifa (IL); Ruben Ashel Miskevski, Jerusalem (IL); Patrick Cannon, Tetsworth (GB); Philip Chasmar, Coto de Caza, CA (US)

(72) Inventors: Victoria Feldman, Moshav Hagor (IL); Slavek Fitinbiviesky, Cracow (PL); Yossi Avraham, Petach Tikva (IL); Alex Pritsert, Haifa (IL); Ruben Ashel Miskevski, Jerusalem (IL); Patrick Cannon, Tetsworth (GB); Philip Chasmar, Coto de Caza, CA (US)

( * ) Notice: Subject to any disclaimer, the term of this patent is extended or adjusted under 35 U.S.C. 154(b) by 0 days.

(21) Appl. No.: 16/045,308

(22) Filed: Jul. 25, 2018

(65) Prior Publication Data
US 2019/0141197 A1  May 9, 2019

Related U.S. Application Data

(60) Provisional application No. 62/536,757, filed on Jul. 25, 2017.

(51) Int. Cl.
| | | |
|---|---|---|
| H04M 15/00 | (2006.01) |
| H04W 4/24 | (2018.01) |
| H04W 4/60 | (2018.01) |
| H04L 29/06 | (2006.01) |
| H04M 7/00 | (2006.01) |
| G06Q 20/36 | (2012.01) |

(Continued)

(52) U.S. Cl.
CPC ........ H04M 15/8044 (2013.01); G06Q 20/10 (2013.01); G06Q 20/16 (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 6,970,909 B2 * | 11/2005 | Schulzrinne | ............ | H04L 29/06 709/206 |
| 8,369,311 B1 * | 2/2013 | Kirchhoff | ......... | H04M 3/42263 370/352 |

(Continued)

*Primary Examiner* — Mazda Sabouri
(74) *Attorney, Agent, or Firm* — Gordon Feinblatt LLC

(57) ABSTRACT

A method and system for least cost routing for mobile telephone calls between the United States and Mexico in such a way so that the call is separated into several call legs and the international portion or call leg is routed via a low-cost or no-cost route independently of the local call legs, essentially achieving an international call with local call rates. This uses a SIM card that automatically identifies any incoming or outgoing call and provides the ability to convert the call from an expensive international and/or roaming call to a local (free) call. Several slight variations are disclosed, and all embodiments have an integrated money transfer service that can be used with a very simple low-cost basic mobile phone using IVR, SMS and voice recognition, or can be accessed via the web or via a smartphone app.

2 Claims, 9 Drawing Sheets

(51) Int. Cl.
*G06Q 20/10* (2012.01)
*G06Q 20/16* (2012.01)
*H04M 3/42* (2006.01)

(52) U.S. Cl.
CPC ......... *G06Q 20/36* (2013.01); *H04L 65/1006* (2013.01); *H04L 65/1069* (2013.01); *H04M 3/42* (2013.01); *H04M 7/006* (2013.01); *H04W 4/24* (2013.01); *H04W 4/60* (2018.02); *H04M 2203/105* (2013.01); *H04M 2203/6063* (2013.01); *H04M 2207/185* (2013.01)

(56) References Cited

U.S. PATENT DOCUMENTS

| | | | | |
|---|---|---|---|---|
| 8,855,107 | B1 * | 10/2014 | Kirchhoff | H04M 1/2535 370/352 |
| 2002/0103899 | A1 * | 8/2002 | Hogan | H04M 3/4228 709/224 |
| 2006/0165092 | A1 * | 7/2006 | Wilson | H04M 3/42263 370/395.21 |
| 2007/0049342 | A1 * | 3/2007 | Mayer | H04M 1/04 455/558 |
| 2008/0130554 | A1 * | 6/2008 | Gisby | H04M 3/4234 370/328 |
| 2009/0203375 | A1 * | 8/2009 | Gisby | H04W 8/30 455/426.1 |
| 2010/0220850 | A1 * | 9/2010 | Gisby | H04K 1/00 379/211.02 |
| 2011/0305331 | A1 * | 12/2011 | Hughes | H04M 7/003 379/202.01 |
| 2015/0230087 | A1 * | 8/2015 | Barkan | H04L 63/0876 455/411 |
| 2015/0304494 | A1 * | 10/2015 | Corfield | H04W 76/10 455/406 |

\* cited by examiner

METHOD AND SYSTEM FOR LEAST COST ROUTING (LCR) OF INTERNATIONAL MOBILE TELEPHONE CALLS WITH AN INTEGRATED MONEY TRANSFER FACILITY

CROSS-REFERENCE TO RELATED APPLICATION(S)

The present application derives priority from U.S. Provisional Patent Application 62/536,757 filed 25 Jul. 2017.

BACKGROUND OF THE INVENTION

1. Field of the Invention

The present invention relates to a telecommunications and financial transaction service, and more specifically, to the application of least cost routing for international mobile telephone calls with an integrated facility for international money transfer services.

2. Description of the Background

Mobile telephony has become almost ubiquitous worldwide. The number of users is ever increasing as are the technologies and services that are available over these devices. Mobile users are able to communicate with anyone in the world without the restrictions and limitations of cables or any fixed customer-side infrastructure. Coverage and the quality of service are continuing to improve providing sustained momentum for this sector to thrive in the years to come. All this progress is both fueled by and a result of the continually falling costs of owning and using mobile telephony devices and services.

Although calling locally on mobile phones has systematically become more financially viable, some costs of mobile telephony services do remain exceedingly expensive. These include the cost of international calls made over mobile telephony networks.

Millions of people in the United States have families abroad and for many of these people, international mobile telephony costs exceed their means. A large portion of these citizens cannot even maintain a landline phone and take advantage of the convenience of "pay-as-you-go" mobile telephony plans.

Today, there are several methods by which international calls can be made over mobile infrastructure that will reduce these telecommunication costs. These include apps installed on mobile phones at both ends of a call where the call setup is initiated via traditional international trunks, the caller's phone rings but is not answered, the call ends and is rerouted to ring on the caller's phone once again. Others involve the dialing of long strings of numbers to complete calls. Others still require an extensive installation of access layer hardware in areas where mobile telephony subscribers to the service reside.

For example, US Patent Applications 20130343246, 20130150010 and 20130343230 all by Manyakin et al. (Power2mobility, LLC) show a method for answering incoming anchored calls through a local number to avoid cost. A call control application server (CCAS) monitors both phones. When a user decides to initiate a call the CCAS receives the inbound call request, extracts the calling number and parks the call. At the called user's phone, the client app rejects the call before the called user can answer, extracts the call setup info, and makes an outgoing call to a local number managed by the CCAS. To reject the incoming call, the called user's mobile handset is equipped with an application client that monitors the call request for pickup number, DTMF sequence sent by server by SMS or through push notification. After providing the call setup info to the CCAS, the CCAs merges the local call to the parked call.

U.S. Pat. No. 8,340,020 to Gan et al. (Industrial Technology Research Institute) issued Dec. 25, 2012 shows a method and gateway for routing international mobile telephone calls. A PSTN gateway is utilized to route an international roaming call so as to achieve the cost-saving objective. A caller in the United States dials the number 4432222222 to reach the roaming subscriber who is currently in Taiwan. The connection request will reach the U.S. PSTN gateway at the caller's location first, and this segment of communication is charged on a local call basis. The U.S. PSTN gateway finds the called mobile phone number through a mapping table and chooses the Taiwan PSTN gateway in the subscriber's home country through an IP network. This segment of communication goes through an IP network rather than through an international call, and thus the cost is reduced. The Taiwan PSTN gateway reconnects to the mobile phone of the roaming subscriber through a GMSC, and this segment of communication is charged on a local call basis.

Also see Lin, Eliminating Tromboning Mobile Call Setup for International Roaming Users, IEEE, 6 pages, January 2009, which explains how a call from the visited country to a roaming customer at that country results in the tromboning effect, but that the two international calls can be replaced with two local calls. The Lin article suggests swapping out SIM cards. Prepaid wireless SIM cards are common in over 50 countries, including most of Europe, United States, Canada, Mexico, Australia and parts of Asia, and account for approximately 10% of all mobile phone subscriber networks around the world. When using a SIM card all transactions are inherently debited to a virtual network operator (usually leasing network bandwidth), and SIM cards frequently include SIM-based applications that run in the background.

All the foregoing may provide for reduced call costs, but involve lost time, awkwardness in their application, and high cost of installation and maintenance of access layer hardware.

As an adjunct to mobile telephony services with cheaper long distance services, cheaper long distance money transfer services would be beneficial. Many traditional money transfer services that are offered today require the physical presence of the sender at a money transfer office with the appropriate amount of cash in hand. Other more sophisticated systems allow a user to interact with the system via a web interface. However, most of these require the existence of a bank account for both the sender and the receiver of the funds. Others may use an extant electronic wallet or service such as Paypal™ for the actual payments of the money to be transferred.

For example, US Patent Application 20140058928 by Cornforth Et al. (Vodaphone) issued Feb. 27, 2014 shows a method and system for transferring funds using a mobile telephone wherein the account is allowed to go or remain overdrawn following the debit.

U.S. Pat. No. 8,781,966 to Blair et al. (Western Union) issued Jul. 15, 2014 shows a money transfer via pre-paid wireless communication devices linked to a pre-paid money transfer account. The wireless communication device may access a pre-directed phone number, e.g., *55, to access a money transfer service provider. Once connected to a money transfer service provider, a user may initiate a money transfer via the wireless device, which is placed directly into the account of a payee or optionally paid to a payee in-person at a money transfer service provider location.

What is needed is a method of money transfer that frees the sender and the receiver from the need to be tied to a bank account, or other financial service. This would require a facility that provides multiple methods of payment and multiple interfaces including connectivity via services available over mobile telephony such Interactive Voice Response (IVR), Voice Recognition, SMS or a mobile app.

SUMMARY OF THE INVENTION

Accordingly, it is an object of the present invention to provide a simple, elegant and least cost international mobile telephony routing service—one that not only provides least cost routing, but can promise international mobile telephony calling with local rates.

It is another object to provide an integrated international money transferring service via mobile telephony without the participation of third party financial institutions.

In accordance with the above-described object, an embodiment of the present invention is a method and system for least cost routing for mobile telephone calls between the United States and international destinations. The invention includes an integrated money transfer facility that allows users to transfer funds from the United States to international destinations using only their mobile phones and a prepaid voucher without the need for bank accounts, credit or IDs. Although this invention can be adapted to be used for calls between the United States and any destination country, its initial embodiment has been tailored to function between the United States and Mexico. As such, it is this embodiment that has been used in the remainder of this document to describe and illustrate the invention's methodologies, functionality and operation.

The invention allows a mobile telephone user in the United States to call a destination in a previously chosen area code in Mexico in such a way so that the call is separated into several call legs. The first call leg, from the mobile phone to the local telco is perceived by the telco as a local call and is charged as such. Similarly, the final call leg from the local Mexican telco to the destination telephone is also perceived as a local call. The international portion or call leg is routed via a low-cost or no-cost route independently of the local telcos on each end, essentially achieving an international call with local call rates.

The invention has several embodiments all involving bidirectional calling between a US based mobile phone using the invention and any mobile or landline phone in a target area code in Mexico. The proposed invention employs a SIM card that automatically identifies any incoming or outgoing call and provides the ability to convert the call from an expensive international and/or roaming call to a local (free) call. In operation both calling and called phones may be equipped with authorized SIM cards running SIM client applications that communicate with control centers in the respective countries. The SIM Card client application monitors incoming/outgoing calls for set parameters (calling or destination number). Upon recognizing an incoming or outgoing call subject to long distance/international/roaming charges the client application coordinates with a local control center to intercept the call and convert it from a roaming call to a local (free) call. The following example illustrates the process . . . .

1st: US Caller dials Called User in Mexico, or any other chosen "destination number". SIM client application recognizes called number and makes the call by Voice over IP (VoIP) for delivery over Internet Protocol (IP) networks. The call protocol is SIP, which is the primary protocol of VoIP, and is from a URI address, which is very similar to an email address, e.g. 12345678@64.21.232.X.

2d: SIP call control information is communicated to US call control center including called number, calling number, HLR and VLR information;

3d: US call control center receives inbound call request, extracts the calling and destination numbers, authenticates both destination and calling numbers, and parks the call & SMS messages.

$4^{th}$: US call control center formulates a call setup request to the called number in said foreign country; automatically determines three or more lowest cost routing options, and transmits the routing options and their costs via SMS to the caller's SIM card application;

$5^{th}$: the caller uses their mobile phone to select their desired lowest cost calling option, and the chosen option is transmitted back to the US call control center;

$6^{th}$: US call control center initiates a new call to the destination number via the route chosen, takes the parked first leg of the call and merges it with the second leg of the call, thus connecting the call from end to end.

7th: The transaction made on the same Id caller and Sim allowing a Virtual card operation as well as account assessments.

Variations on the foregoing embodiment are also disclosed. All embodiments have an integrated money transfer service that can be used with a very simple low-cost basic mobile phone using IVR, SMS and voice recognition, or can be accessed via the web or via a smartphone app.

The above and other objects, features and advantages of the present invention will become readily apparent from the following detailed description thereof which is to be read in connection with the accompanying drawings.

BRIEF DESCRIPTION OF THE DRAWINGS

Other objects, features, and advantages of the present invention will become more apparent from the following detailed description of the preferred embodiment and certain modifications thereof, in which.

DETAILED DESCRIPTION OF THE PREFERRED EMBODIMENTS

The present invention is a system and method of least cost routing for mobile telephone calls between two countries, e.g., the United States and Mexico. A preferred embodiment of the invention also includes an integrated money transfer facility that allows users to transfer funds between the United States and Mexico using only their mobile phones and a prepaid voucher without the need for bank accounts, credit or IDs. The invention allows the routing of these calls in such a way so that the calls are seen by telecom operators as local calls. This is achieved by the use of an application embedded in a SIM card in the mobile device as well as an application server that provides least cost routing as well as call leg management.

The SIM card when activated in the United States allows the device to become associated with a local United States mobile number as well as a corresponding local Mexican telephone number. The United States mobile number is sent to the user via an SMS text message and is within the area code of the location of the user. The Mexican telephone number is chosen during the initial setup by the user such that it is in the target area code. The target area code is the area code of the intended destination of the user's calls to Mexico.

When activated in Mexico, the SIM card becomes associated with a local mobile number only. The invention does not include LCR for calls made from the mobile in Mexico to third party telephone numbers in the United States.

Once the initial setup is complete, calls can then be placed from
- the mobile telephone in the United States to destination numbers in the target area code in Mexico;
- telephones in the target area code in Mexico to mobile telephones in the United States;
- mobile telephones in the United States to a mobile telephone in Mexico; and
- mobile telephones in Mexico to a mobile telephone in the United States.

A first embodiment of the invention is described with reference to telephone calls originated from a mobile telephone in the United States to a landline or mobile destination in the target area code in Mexico. This is done in such a way so that only local charges are incurred on the US side of the communication, and least-cost-routing (LCR) is employed to achieve a low cost for the internationally routed part of the call.

Figure 1:
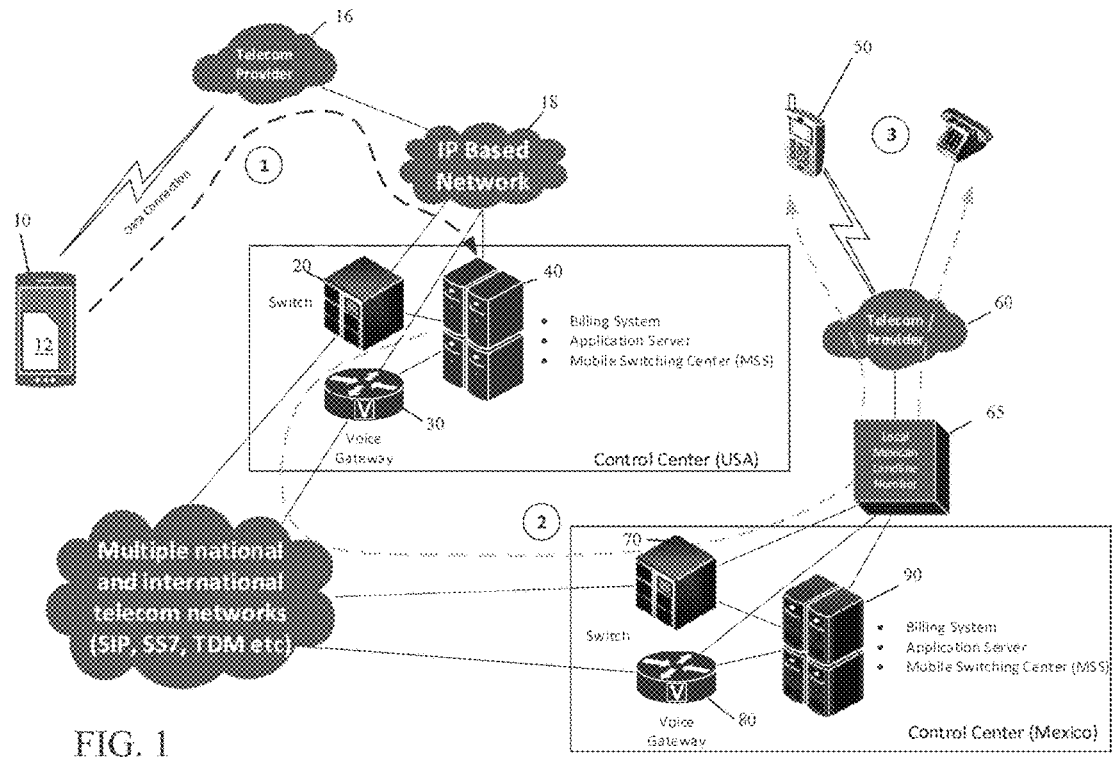
FIG. 1 shows the LCR procedure of a call originating from a US based mobile phone using the invention to a mobile or landline telephone in the target area code in Mexico.

As shown in FIG. 1, the present system includes a specially-programmed SIM card 12 installed in the originating telephone, here US mobile telephone 10. The present system also relies on a dual-control center architecture comprising a US-based control center and a Mexico-based control center. The US-based control center includes application server (AS) 40, voice gateway 30, and switch 20. The Mexico-based control center similarly includes application server (AS) 40, voice gateway 30, and switch 20.

The sequence of operation is as follows:

1. US mobile telephone 10 calls a Mexican number (either landline or mobile) in the Mexican area code that was chosen as the target area code during initial setup. In this embodiment, the receiving telephone, here Mexican mobile telephone 50, is using a third party mobile provider 60 and is not using the invention.

2. The SIM card 12 of the calling US mobile telephone 10 recognizes that a call is being initiated and originates the call via Voice over IP (VoIP) over the data connection of the mobile telephone 10 using Session Initiation Protocol (SIP). SIP calls utilize a Uniform Resource Identifier (URI) in the form of the telephone number along with the IP address of the mobile telephone on the data network. This URI is of the form 8185551234@65.128.55.4.

3. Once a call has been dialed, the SIM card 12 application on the mobile telephone 10 communicates call control information to the AS 40 as indicated by (1) in FIG. 1. This information includes called number, calling number, HLR and VLR information.

4. The AS 40 recognizes and authenticates the mobile telephone 10 caller based on the URI and terminates the first leg (1) of the call. This leg (1) is considered a local call and is charged as such. The AS 40 parks this locally terminated call (1). All subsequent call legs are unseen by the local telecom provider 60.

5. The AS 40 formulates a call setup request to the called number in Mexico and, before initiating it, automatically determines the lowest cost routing options. Generally these options include SIP over private or public networks, SS7, TDM and others. The AS 40 then transmits the single cheapest preferred call option to the caller's SIM card 12 application using the Unstructured Supplementary Service Data (USSD) protocol, which then instructs the caller's phone 10 to initiate the call using the preferred call option.

6. This information is returned to the AS 40 which then initiates a new call to the destination number via the route chosen, all as indicated by (2) in FIG. 1. The local telephony switches and voice gateways are used to connect the call using a combination of SIP, g711 codec and TDM floating above the PSTN and VoIP.

7. The call (2) is routed to telephony switch 70 or voice gateway 80 (depending on the choice made) in Mexico, and in turn to the associated Mexican landline number and is terminated (ended) at the originally called destination number. This is the second call leg (2) originating from the US Control Center and terminating on the destination number via the local Mexican landline number 65. As indicated by (3) in FIG. 1, the destination number can be either a mobile or landline number. This call leg (3) is routed via third party telecom provider 60 in such a way that it remains unseen by the US telecom provider 16. This call leg (3) incurs reduced costs based on the algorithm applied in the AS 40.

8. Once the second call (2) is terminated (ended) using the local Mexican landline number 65 to the destination number, the AS 40 takes the parked first leg (1) of the call and merges it with the second leg (2) of the call thus connecting the call from end to end.

9. After the call is complete and the users hang up, the originating caller is provided with a report on the screen of the mobile device 10 indicating the number of minutes used. Additionally, cost and remaining balance information will be displayed depending on the payment plan the caller is using (pay as you go or flat fee with unlimited minutes) and on the initial choice of call route and cost the caller selected. The above-described embodiment of the invention has the following call legs and incurs the following associated costs:
Call leg 1—Originator 10 to AS 40 using VoIP/SIP—local call costs Call leg 2—AS 40 to original destination 50 via SIP/g.711/TDM/SS7 depending on users choice—low cost alternative routing.

Figure 2:
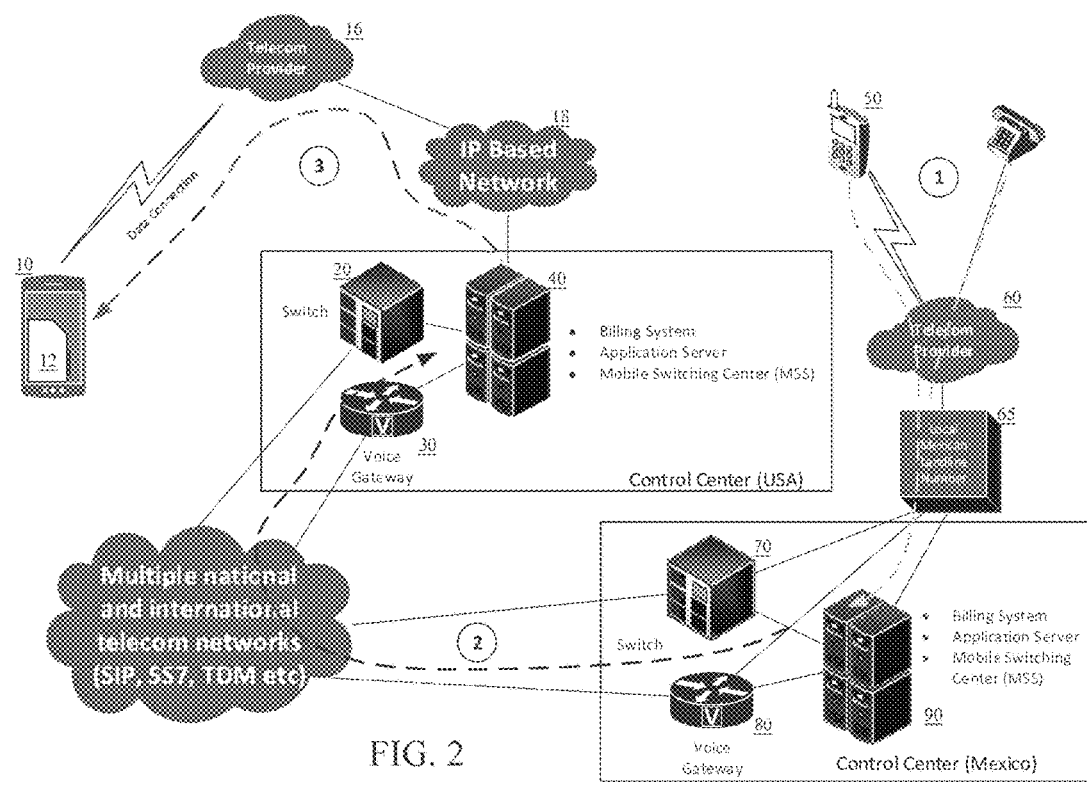
FIG. 2 shows the LCR procedure of a call originating from a telephone in the target area code in Mexico to a US based mobile phone via the local Mexican landline number

As shown in FIG. 2, a similar routing procedure can be employed for calls originated from a Mexican telephone number within the target area code to a US based mobile telephone 10 using the invention's SIM card 12 via the local Mexican landline number 65. In this example, the originator of the call is any landline or mobile number (excluding mobiles using the invention's SIM card 12) that are within the target Mexican area code while the destination number is a mobile telephone 10 using the service's SIM card 12.

This sequence of operation is as follows:

1. A Mexican landline or mobile telephone 50 calls the local Mexican telephone number paired to the US mobile telephone 10 using the service. This call (1) reaches the Mexican Control Center.

2. The AS 90 recognizes that this is a number paired with an US based mobile 10 using the invention's SIM card 12 terminates the first leg of the call at the Control Center in Mexico. This is indicated by (1) in FIG. 2. This leg (1) is considered a local call and is charged as such. The AS 90 parks this call locally and all subsequent call legs are unseen by the local telecom provider 60.

3. The AS 90 knows the corresponding number of the US based mobile phone 10 and initiates a call setup request to this number using Least Cost Routing. Again, these options include SIP over private or public networks, SS7, TDM and others.

4. Once the lowest cost has been determined, the call is routed to the Switch or Voice Gateway (depending on the routing method) in the Control Center in the USA as indicated by (2) in FIG. 2. This is the second call leg and is unseen by the local telecom providers on either end of the call. Caller ID, called number and the Mexican based landline number are all transmitted along with the all call control information for the call. At this point, the original call leg (1) is merged with this call leg (2).

5. The Control Center in the USA receives the information and performs the third and final call leg reaching the US based mobile phone 10 via Voice over IP over its data connection. This is indicated by (3) in FIG. 2.

6. Once the US mobile phone 10 starts ringing, the call that was parked at the Control Center in Mexico is connected with the second call leg (2) to connect the call end to end.

This embodiment of the invention has the following call legs and incurs the following associated costs:

Call leg 1—Originator 50 to Mexican Control Center using VoIP/SIP over data connection—local call costs Call leg 2—Mexican Control Center to US based Control Center SIP/g.711/TDM/SS7 depending on LCR—low cost alternative routing;

Call leg 3—US based Control Center to US based mobile device using VoIP/SIP—local call costs.

Another preferred embodiment of the present invention proposes a method of least cost routing for bidirectional telephone calls between mobile telephone 10 in the United States using the invention and a mobile phone 50 in Mexico also using the invention. This is done in such a way so that only local charges are incurred on both the US and Mexican side of the communication.

Figure 3:
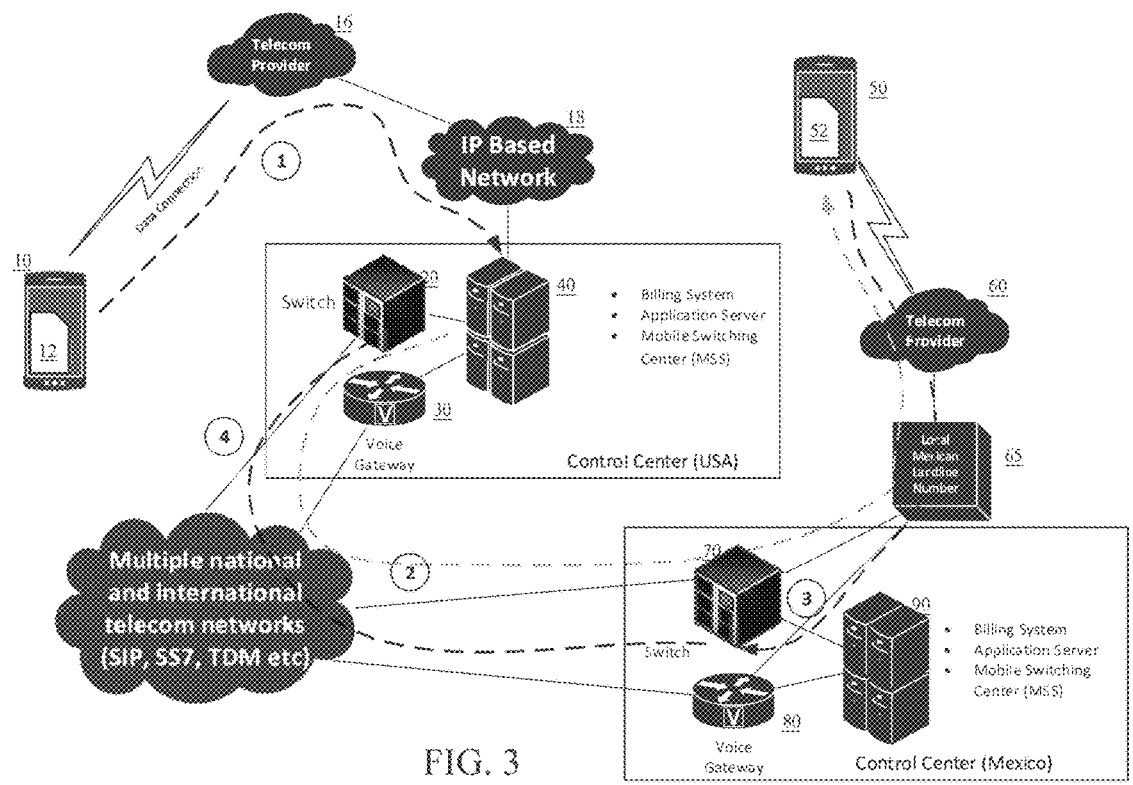
FIG. 3 shows the LCR procedure of a call originating from a US based mobile phone using the invention to a Mexico based mobile phone also using the invention.

As shown in FIG. 3, this sequence of operation is as follows:

1. A US mobile telephone 10 calls a Mexican mobile telephone 50. Both are using the LCR SIM service.

2. The SIM card 12 on the caller's phone 10 recognizes that a call is being initiated and originates the call via Voice over IP (VoIP) over the data connection of the mobile telephone using the Session Initiation Protocol (SIP). Such calls utilize a Uniform Resource Identifier (URI) in the form of the telephone number along with the IP address of the mobile telephone on the data network. This URI is of the form 8185551234@65.128.55.4.

3. Once a call has been dialed, the SIM card 12 application on the mobile telephone 10 communicates call control information to the AS 40 as indicated by (1) in FIG. 3. This information includes called number, calling number, HLR and VLR information.

4. The AS 40 recognizes and authenticates the caller 10 based on the URI and terminates the first leg of the call. This leg is considered a local call and is charged as such. The AS 40 parks this locally terminated call. All subsequent call legs are unseen by the local telco.

5. The AS 40 also recognizes that the called number belongs to the service as well. The AS 40 sends a prompt to the called user's phone 50 (via SMS, IP, missed call or otherwise) as shown by (2) in FIG. 3. The SIM application 52 of the called user 50 intercepts the prompt and identifies that the AS 40 has received a call destined for this phone.

6. The called phone 50 initiates a call to the local Mexican number 65 associated with the caller's phone 10 during the service setup as shown by (3) in FIG. 3. The SIM card 52 recognizes that a call is being initiated and originates the call via Voice over IP (VoIP) over the data connection of the mobile telephone 50 using Session Initiation Protocol (SIP). The call reaches the Mexican Control Center.

7. The AS 90 in Mexico recognizes that this is a number paired with a US based mobile using the invention's SIM card 52 and terminates the first leg of the return call at the Control Center in Mexico. The AS 90 parks this call locally and all subsequent call legs are unseen by the local telecom provider 60.

8. The AS 90 knows the corresponding number of the US based mobile phone 10 and initiates a call setup request to this number using Least Cost Routing. Again, these options include SIP over private or public networks, SS7, TDM and others. This call setup (4) is merged with call leg (3) at the Mexican Control Center.

9. This call leg (4) reaches the Control Center in the USA and the AS 40 recognizes this leg as the return leg of the original call (1).

10. The AS 40 matches the called user's call with the information in the HLR database, authenticates it and retrieves and merges it with the initial parked call thus connecting the call from end to end.

11. Once the call is complete and the users hang up, the originating caller is provided with a report on the screen of the mobile device 10 indicating the number of minutes used. Additionally, cost and remaining balance information will be displayed depending on the payment plan the caller is using (pay as you go or flat fee with unlimited minutes) and on the initial choice of call route and cost the caller selected. This embodiment of the invention has the following call legs/interactions and incurs the following associated costs:

Call leg 1—Originator to AS using VoIP/SIP—local call costs

Prompt—AS in USA to Called Party via SMS, IP, missed call or otherwise

Call leg 2—Called party call to local Mexican number—local call costs

Call leg 3—Control Center in Mexico via SIP/g.711/TDM/SS7—LCR

Figure 4:
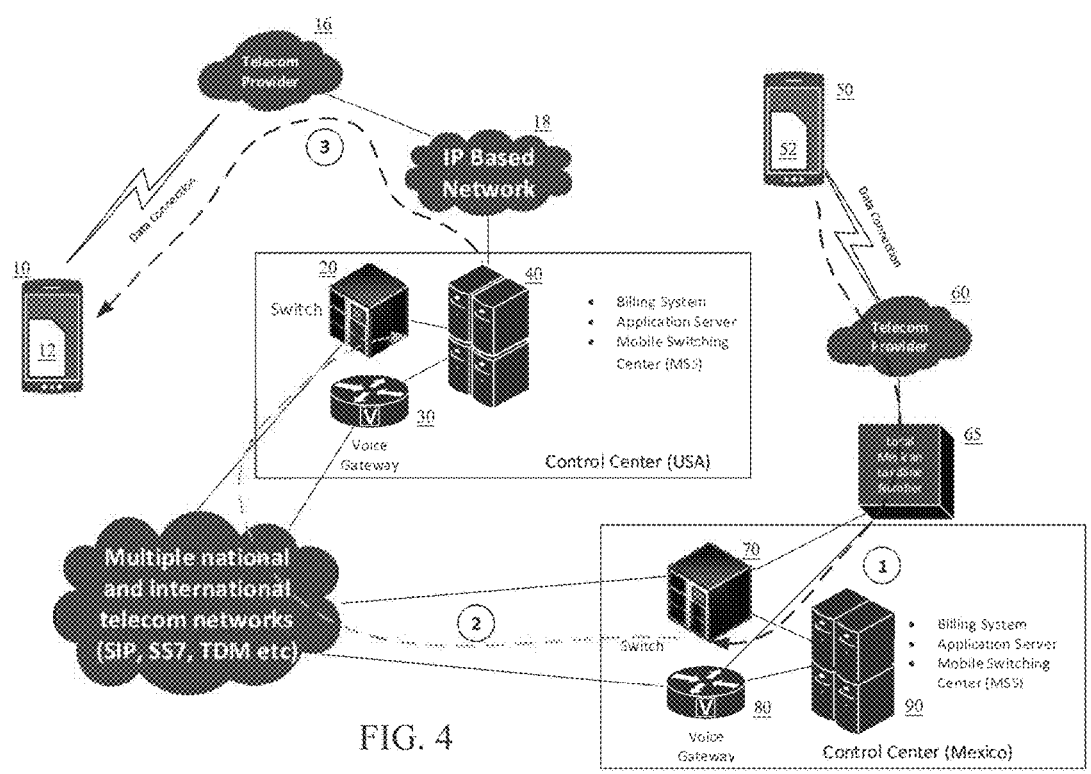
FIG. 4 shows the LCR procedure of a call originating from a Mexico based mobile phone using the invention to a US based mobile phone also using the invention.
Figure 5:
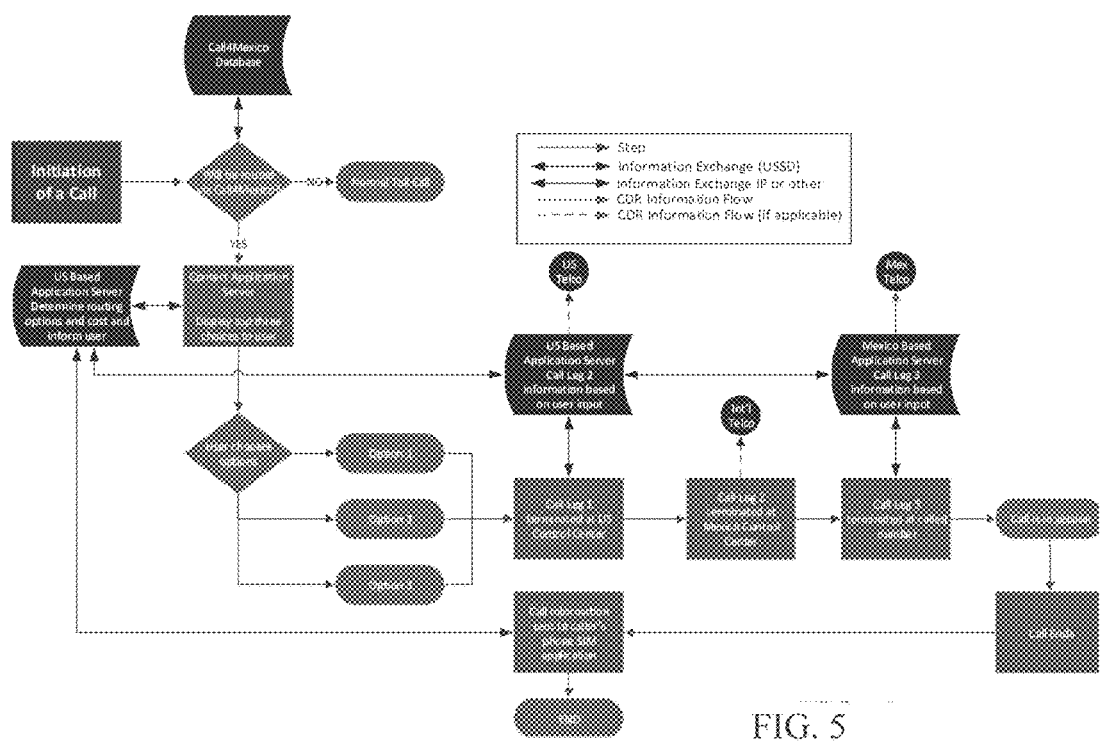
FIG. 5 depicts a detailed block diagram of the least cost routing procedure and methodology.

Another embodiment entails a Mexico-based mobile phone 50 calling a US based mobile phone 10. As shown in FIG. 4, this sequence of operation is as follows:

1. A Mexican based mobile phone 50 using the invention calls the local Mexican telephone number 65 paired to the US mobile telephone 10. This call reaches the Mexican Control Center and can be seen by (1) in FIG. 4.

2. The SIM card 52 of the caller recognizes that a call is being initiated and originates the call via Voice over IP (VoIP) over the data connection of the mobile telephone using Session Initiation Protocol (SIP).

3. Once a call has been dialed, the SIM card 52 application on the mobile telephone 50 communicates call control information to the AS 90 at the Control Center in Mexico as indicated by (1) in FIG. 4. This information includes called number, calling number, HLR and VLR information.

4. The AS 90 recognizes and authenticates the caller based on the URI and terminates the first leg (1) of the call. The AS 90 also recognizes that the called number is a number paired with a US based mobile 10 using the invention's SIM card 12. The AS 90 parks this call locally and all subsequent call legs are unseen by the local telecom 65.

5. The AS 90 knows the corresponding number of the US based mobile phone 10 and initiates a call setup request to the corresponding Control Center in the USA using Least Cost Routing. These options include SIP over private or public networks, SS7, TDM and others. This is indicated by (2) in FIG. 4.

6. This call (2) reaches the AS 40 in the US based Control Center. This AS 40 recognizes the Caller number, the Called number and the US based mobile 10 number and authenticates the call. The call is then terminated and parked at the US based Control Center. In the meantime, the Control Center in Mexico merges the two call legs.

7. The AS 40 initiates a Voice over IP call using SIP to the destination mobile phone 10 over mobile device's data connection as indicated by (3) in FIG. 4.

8. Once the call reaches the called party, the original parked call leg (2) is merged with the final call leg (3) and the call is connected from end to end.

9. Once the call is complete and the users hang up, the originating caller is provided with a report on the screen of the mobile device 50 indicating the number of minutes used. Additionally, cost and remaining balance information will be displayed depending on the payment plan the caller is using (pay as you go or flat fee with unlimited minutes) and on the initial choice of call route and cost the caller selected. This embodiment of the invention has the following call legs and incurs the following associated costs:

Call leg 1—Originator to local Mexican number using VoIP/SIP—local call costs

Call leg 2—Mexican Control Center to US based Control Center SIP/g.711/TDM/SS7 depending on LCR—low cost alternative routing Call leg 3—US based Control Center to US based mobile device using VoIP/SIP—local call costs.

One of the key features of the invention in all the foregoing embodiments is that it functions in such a way so that all portions of a call are considered local calls by the respective local telecom providers. This is the case for all embodiments of the invention as described above, regardless of the direction or the initiator of the call. This is achieved by separating the voice (bearer) channel from the signaling channel and essentially terminating the signaling locally. The first call leg (1) between the Caller 10 and the US based Control Center 40 is terminated such that the caller and called number in the signaling are both US based numbers.

Figure 6:
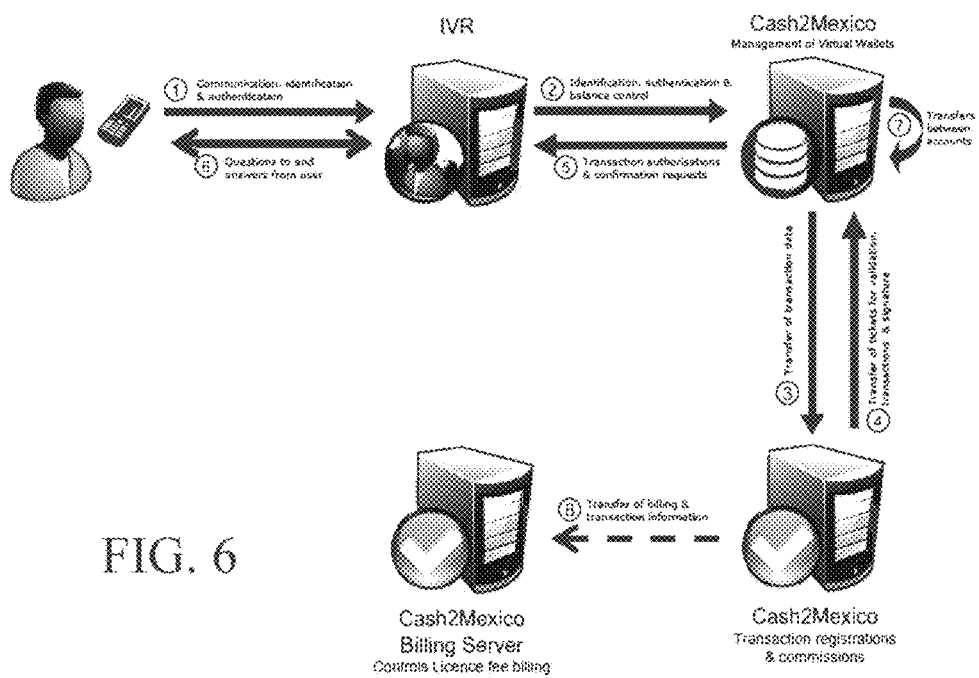
FIG. 6 shows the interaction of a user with the money transfer service using an Interactive Voice Response (IVR) system.

The second call leg (2) is created between the two control centers and uses, in most cases, VoIP technology over the Internet. The call signaling in this call leg is initiated and terminated by the two control centers 40, 90. Finally, the third call leg (3) is between the local telco 60 and the destination number 50 where the caller and called numbers contained within the call control information are both local numbers. Telecom providers derive their fees by the Call Detail Records (CDRs) that are generated from the call control information. Specifically, they use the caller number and the called number to determine the nature of the call, that is, if it is local, long distance or international. The call control information from each of the above call legs is isolated for each leg. For example, the telecom provider 16 in the US, based on the CDRs "sees" a local call which is initiated at the mobile device and is terminated at the US based Control Center 40. Caller and called numbers in the call control information are both US based. Similarly for the third call leg, the telecom provider 60 in Mexico, again based on the CDRs, "sees" a call which is initiated and terminated by two local Mexican numbers. The second call leg (2) generates CDRs at both control centers 40, 90, but because in most cases this call leg will go over the Internet using Voice over IP (VoIP), no calling restrictions can be enforced. For each call leg, there are several choices for routing a call and the choice that is made can be influenced by several factors. The resulting routing in turn will also influence the resulting cost of the call. The details of these choices can be seen in the flow chart found in FIG. 6. The example used is a call from a US based mobile device using the invention to a Mexican landline destination. The following procedure is followed:

1. A call is initiated and the destination number is compared to the database of the service to determine if:

a. the destination is a number in Mexico that is also using the invention or b. the destination number is within the target area code in Mexico that was configured during the initial setup of the service.

2. If none of these are true, then the call is routed normally over the PSTN with the normal toll charges.

3. If the call does conform to one of the above criteria, then the SIM card application communicates with the US based AS 40 using Unstructured Supplementary Service Data (USSD) codes to determine the cost options available to the user.

4. The SIM card application by default chooses the lowest cost option automatically and routes the call accordingly. However, it can be configured to allow the user to make the choice. Through the USSD communication, the SIM card application can display the three options to the user who then chooses one.

a. Note that the three options include any combination of the following i. Method of routing for call leg 1 (SIP, GSM)

ii. Method of routing for call leg 2 (SIP, SS7, TDM and others)

iii. Method of routing for call leg 3 (SIP, GSM, TDM depending on whether destination is a subscriber to the service, a third party mobile phone or a landline phone)

b. Each method of routing will incur a different cost and this is the criterion that is used for the user choice.

c. The options available may also be influenced by what is available at that particular time. This can be affected by i. Network congestion ii. Network availability iii. Existence of a network problem or malfunction 5. Depending on the configuration, the best choice is automatically chosen or the user makes a choice and this information is sent to the AS 40 using USSD.

6. The first call leg is then initiated from the handset to the US based AS 40 based on this choice.

7. The first call leg is terminated at the US based AS 40 and CDR information is recorded and
   a. is sent to the US based telecom provider 16 for costing purposes if GSM is the routing choice
   b. does not have to be sent to a telco 16 if SIP over the data connection of the phone is the routing choice 8. The second call leg is initiated between the US based telco 16 and Mexico based control center 90.

9. CDR information is recorded at both ends.
   a. If this leg uses a third party telco 60 CDR information is given to the telco 60 for costing purposes.
   b. If this leg uses the Internet for call routing, no CDR information is given 10. The third call leg is initiated from the AS 90 Control Center in Mexico to the destination.
    a. CDR information for the local call is recorded and given to the local telco 60 for costing purposes 11. The call is now in session.

12. Once the call ends, the voice channel is torn down.

13. The users handset communicates with the US based AS 40 over USSD and call information including duration, cost and remaining minutes are displayed on the handset 10 via the SIM application 12.

14. All call control and voice communication that has been initiated for this call is terminated.

Integrated Money Transfer Service

This embodiment of the invention involves a mechanism for transferring money that is integrated as part of the invention. It is a service which allows the transfer of funds using a multitude of methods, including ones that do not require the use of a financial institution such as a bank. Specifically, it provides for Mexican Americans who desire to send money to their loved ones in Mexico. The invention can however be adapted for international money transfer to most countries abroad. 57% of Mexican Americans and 62% of Mexican residents do not have bank accounts. Sending money between these two groups of people requires a method that does not involve the use of bank accounts. To provide for the needs of all potential users, there are several methods by which a client can receive funds. These include:

e-wallet—an electronic wallet on the invention's platform where funds can be electronically deposited
   Debit card—a debit card that will be issued to which credit can be added
   Bank account—a bank account to which funds can be deposited
   Physical pickup—multiple physical locations where the receiver can pick up the funds in cash It is important to note here that the interface to the system for sending money is either via a web interface, mobile app, SMS text messaging or via an IVR system. This means that even with basic mobile telephone (not a smartphone), all of the described transactions can be achieved. These options are further discussed and described in the following sections including an example of the functionality of the embodiment with all of the above options.

Figure 8:
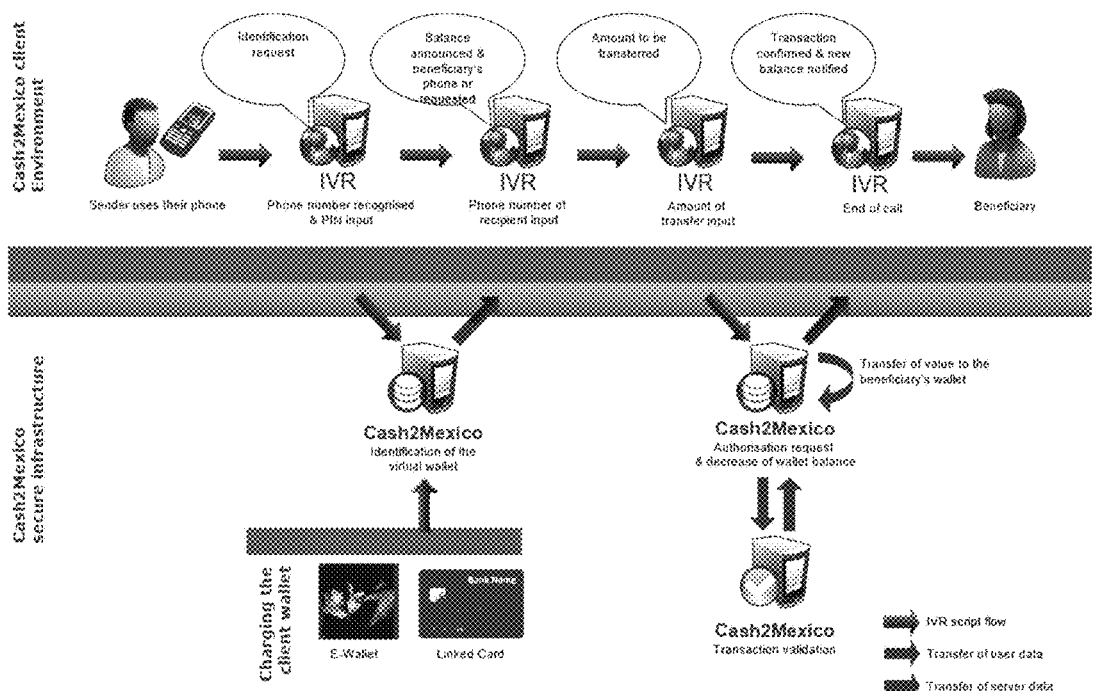
FIG. 8 describes the step by step money transfer procedure at a high level.

Web access—The main access to a CASH4MEXICO powered platform is via a web page available on any web browser supporting Java Script. All users (e-wallet holder, merchant account holder, agent, and administrator) can access the system via a specific web page. The module can be accessed at the domain name that the CASH4MEXICO operating company has chosen. See FIG. 8 for an exemplary architecture that includes a description of web access.

Figure 7:
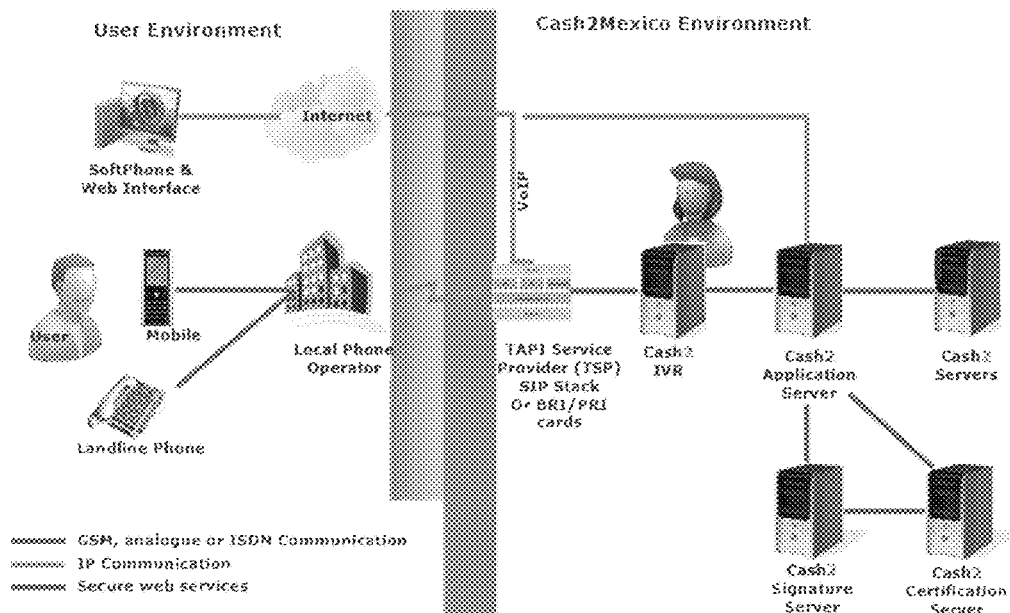
FIG. 7 depicts the architecture of the money transfer system.

Telephone access—User may access CASH4MEXICO powered platform services with any telephone, either landline or mobile, as long as it is DTMF enabled. A telephone may be used for basic actions like enrolment, listening to or requiring an SMS with balance and/or last transactions, transferring to another wallet holder, purchasing and paying for a good or a service at an e-phonestore, paying securely for an online purchase, or paying at a merchant WAP Phone or APP enabled PoS. See FIGS. 7 and 11 for IVR functionality.

Figure 10:
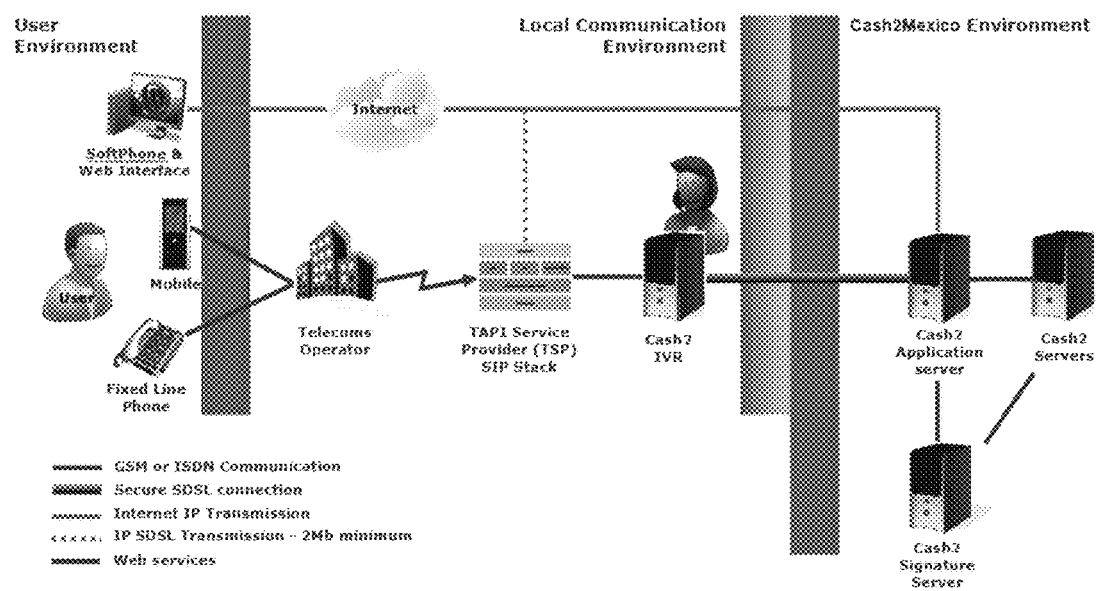
FIG. 10 shows the money transfer architecture with a local interactive voice server.

WAP phone module—A WAP module can be specially developed so as to provide a simple text page that can be prompted on a feature mobile phone on the screen of which users may login and perform certain transactions. This is especially true where a CASH4MEXICO powered platform serves informal merchants and businesses than cannot access Web pages over a computer or a smartphone, so that their feature phone may be used as a PoS to receive consumer payments in a convenient way. Specifically designed modules can also be developed to supply agents that may serve as a cash in/cash out Point. See FIG. 10 for WAP phone module connectivity.

APPs module—An App module for iOS or Android can be specially developed so as to provide easy to use services that may enhance the efficiency and speed up certain services and transactions.

PoS Device module—PoS device module can be developed so as to provide an easy to use payment process over POS such as cash register terminals or petrol/gas delivery automats and so forth.

e-phone store online payment page—This module allows e-commerce sites to use CASH4MEXICO powered platform as a payment provider. This process enables paying swiftly with a card (PCI DSS) via a simple phone call without being required to enter or disclose card details. This module may be custom developed to enable redeeming loyalty points and/or combining payment in points and classical currency.

Access via an agent in a branch or at a call center—A CASH4MEXICO powered platform enables agents to operate on the behalf of an e-wallet holder while keeping the agent under constant control of the system all along the transaction and enabling the wallet holder to sign securely without disclosing the signature to the agent.

Enroll, Register & Login—By default, enrolling and registering to a CASH4MEXICO powered platform requires a simple phone call to the dedicated enrolment service number. Registering and opening a wallet can be performed in about 45 seconds.

Once a holder has opened his wallet, it is not mandatory that he accesses CASH4MEXICO powered services from the telephone he used to register. It is possible to interact with a wallet via any phone or web connected device. It is also possible to enable the registration process from a web page providing the registrant holds a telephone that can receive SMS text messages.

Once it has been opened, the initially available e-wallet services are usually restricted to some basic functions such as balance consultation, editing personal details and limited cash and transfer collection. At creation, an e-wallet is strictly anonymous and therefore the transactions that can be delivered to the holder are restricted. In particular, limitations apply to the maximum amount that can be topped up in an anonymous e-wallet holder account. Limitations and rules that apply to e-wallets depend on the CASH4MEXICO powered platform operator's local legislation and on international banking rules (KYC—Know Your Customer, Anti money laundering, anti-terrorist)

Contextual signature setting—By design, the CASH4MEXICO transaction process requires the e-wallet holder who initiates the transaction to sign with his personal signature before the transaction actually takes place.

The personal signature, referred to here as the "contextual signature," is verified in real time by a specific server, called CashTap, which will return a "green light" to the CASH4MEXICO server indicating that the transaction is valid.

To be able to sign when he is requested to do so, the e-wallet holder must first enroll to the CashTap server.

To do so the holder is requested to call the CashTap server phone number which is a dedicated enrollment service number, and then follow the prerecorded instructions. He will be directed to input the necessary information that each e-wallet holder must provide to enroll. The registration and the opening of an e-wallet can be performed in about 45 seconds.

Wallet holder personal details input validation and certification—Although an e-wallet holder may decide to remain totally anonymous—for example a tourist that will use his e-wallet for a limited period of time and for a limited number of transactions—it is highly valuable for him to document his account and expand its services by going through a validation and certification process since the available features for an anonymous user are comparatively limited.

It is also possible to enable the registration process from a web page providing the registrant holds a telephone that may receive SMS messages. In order to prevent 'bogus' or automated logins e-mail validation can be required and a Captcha image can be enabled.

Status—At the entry or home page, a window is available to the user with direct links to actions related to recent events and changed statuses that can include received payments, loans, references and personal alerts.

Quick access—At the entry or home page a window with clickable icons will give direct access to the most used functions.

Message board—The home page will show a message board that can be updated by the organization from the administration panel.

Payments—The CASH4MEXICO powered platform supports direct (normal) payments, scheduled payments (installments), authorized payments and invoices.

Account summary & history—Members can view account information such as available balance, credit limit and can search for transactions in the transaction history list.

Member profile—A member can update his or her profile and insert one or more pictures. A member can choose to hide certain fields for other members such as the address and phone fields. The administration can define which profile fields can be modified and hidden by the member and also defines if a field is mandatory.

Member directory—Members can look for other members (or businesses) with a fully indexed search.

Messaging system—Members can send messages to each other. The message function supports rich text editing. Administrators can define specific message categories for member-to-system messages (e.g. 'support', 'loan request' etc.)

Mailings—Administrators and brokers can send mailings to groups of members with the messaging system.

Marketplace—An online venue where members can publish advertisements (products and services), upload pictures and search for advertisements.

Advertisement interests—Members can register one or more 'interests' or advertisement criteria. For example a member can register a new interest for 'Offers' in a specific category like 'vehicles', price range, keyword etc. When a new advertisement is placed in the system that matches the criteria the user will receive an instant notification (via e-mail or mobile phone depending on the preferences).

Notifications—In the notification page a member can define what kind of notifications to receive, like account alerts, information on received loans, payments, references or invoices.

Additional notifications can be configured such as new member and administration messages and 'ad interest' matches. The member can also define if she wants to receive the notifications as internal CASH4MEXICO powered platform messages and/or via e-mail or SMS.

Contacts—Members can add other members to a personal a contact list in order to quickly perform any actions related to the other member (make payment, send e-mail etc.). In the contact list it is also possible to add a personal note to a contact. This note is not visible to other members, nor to administrators.

Reports & activities—A member can obtain an overview of the activities of another member. The reports page will show general information like how long the member has been in the system and the number of advertisements and references. The report function can also show account information like balance and credit limit but this is an optional feature and disabled by default.

References and referrals—Members can set referrals to other members. The administration can pre-define the possible reference values and activate the alerts system when thresholds are reached or exceeded (e.g. x amount of negative references received)

Transaction qualifications—These qualifications are similar to references but related to specific transactions. Both payer and receiver can qualify the transactions and the administration can put a final comment in case of conflict.

Loans—The loans function is mostly used by micro finance and 'currency backed' networks and probably somewhat less for mutual credit networks. A member can receive personal loans or loan groups (micro credit type). The loan page in the member section gives an overview of all the loans with their status and repayment dates.

Operators—Operators can be seen as 'sub' members managed by members (businesses) where multiple persons need to access a 'company' account. A member (business) can create operators and set permissions. The member can search and retrieve reports on payments performed by specific operators.

Broker/Loan agent—A member of a 'broker' group can register new members and have some level of access and control over these members, depending of the configuration. The name 'broker' may not be fully descriptive of this feature because this function can be used in many ways. A common function is that a broker can receive commission when registering members. The commission can be configured based on the amount of trade done by the new members. A broker may be allowed to do part of the personal administration for members who are not able to do this themselves. This can be useful for communities where persons do the administration for members who do not have the ability to do this themselves. The broker function can also be used by loan agents in micro finance systems. The loan agent can also register new members and retrieve information about the loan status of the members.

Help function—The CASH4MEXICO powered platform includes a manual that describes all the functions. In addition to the manual, every functionality window has its own help (pop-up) file with an explanation of that function.

Administration Functions Include the Following:

Status—The entry of the administration section gives a quick overview with the system status and other information like the release number, system uptime, alerts, connected users, open system invoices, and received messages. All the items have direct links to the related function window.

Member management—Most actions related to members are done from the actions window below the member profile page. Using the 'jump to profile' function at the entry page an admin can quickly get to this page.

Configuration—The CASH4MEXICO powered platform has configuration at individual, group and system wide levels (where lower configuration will always override configuration on higher levels, e.g. individual configuration will override group configuration)

Account structure—The account structure is entirely dynamic. Accounts, currencies and transaction types can be created and configured.

Group based structure—User groups can be created and permissions and rules set. An administrator can modify the default 'built-in' groups and create new groups and assign permissions to them. Administration groups can be created to organize and delegate different administration tasks like member account administration, loans administration and system administration. The CASH4MEXICO powered platform also comes with built-in administration groups. For more complex systems that have various communities with multiple currencies and different levels of internal trade the 'group set' or 'group filter' function can be used. With this function it is possible to join various member groups in a logical entity or 'community' group. Such a community group could be an isolated group with its own rules, pages and layout but the administration can also allow payments between communities.

Contributions & Fees—CASH4MEXICO powered platform has various types of fees and contributions like transaction fees, interest and demurrage. There are many ways the fees can be configured and charged.

Charge (roll) back of payments—An administrator (with permissions) can "undo" a payment. This means that a payment in the opposite direction will be generated. If the specific payment generated other transactions (e.g. fees and loans) all transactions will be rolled back.

Loans & credit—There are many ways in which the CASH4MEXICO powered platform can handle the granting of loans and credits. It is possible to set 'personal' credit limits to members or groups. This is common for mutual credit networks and Time banks where users start with a zero balance and can go either into debit or credit. Monetary systems that work with backing like micro finance and commodity backed systems can implement a 'Debit' or 'Float' account for creation of units and the handling of loans. Different types of loans can be created like single loans and loans with periodic loan repayments. Additional loan settings and fees can be configured per loan type. Next to the 'individual' loans the CASH4MEXICO powered platform supports loans to 'group loans' which is common for micro finance projects.

Alerts & logging—Alerts can be defined for system alerts, member related alerts and thresholds. The alerts system is part of the messaging system. All actions in the system are logged with a time stamp, username and possible form values. Both the alerts and log system have a searchable history.

Personal alerts—An admin can configure specific alerts to be sent automatically to his e-mail address. For example, these can be system and member alerts but also alerts on specific types of payments that are made.

Custom fields—Most fields in CASH4MEXICO powered platform are not fixed or 'hard-coded'. It is possible to define new 'custom' fields for profiles, advertisements, loans and payment types. An admin can define the type of field (e.g. text area, select box or radio button) and behavior for these fields (e.g. input mask and validation). It is possible to have different profile fields for member groups.

Content management—Administrators can create and modify pages such as the login page, news, message board, contact information, top banner and others, and set their visibility for specific groups. It is possible to upload and insert images into the pages. With the same function the CASH4MEXICO powered platform layout (colors, fonts and borders) can be modified. To facilitate easy changes to the layout the CASH4MEXICO powered platform comes with 'themes'. It is possible to create new themes and export and import them.

Translation management—The CASH4MEXICO powered platform translation can be modified online and changes will appear immediately (no restart needed). It is possible to import and export translation files.

Record types—Member record types can be used to store additional information to members in a structured way. A member record type can be built using 'custom fields' and can be configured in many ways. Typical record types include a call center function or credit analyses storage. An extra menu entry can be displayed per record type that will give direct access to a search page within the records.

Documents—The administration or broker/loan agent can attach files or documents to individual members or groups of members. The visibility can be configured for administration only for both administration and members. A broker or loan agent can be given permissions to manage the documents. It is also possible to specify 'dynamic' documents. This means that a member can print a document that will automatically include some of his profile fields. If needed the member can first be presented with a form to be filled in. The form data can also be included in the resulting document along with the profile fields. Dynamic documents are made by the administration in HTML format and can be in rich format and contain images. Typically dynamic documents are used when the organization requires a document signed by the member and to verify it contains certain member fields and optionally extra member input.

Messaging—As explained in the member section members can send messages between them. Members can also send messages to the administration. Messages between members and the administration must always have a message category (e.g. question, problem, loan request). The categories are defined by the administration. It is also possible to define which administration group will handle messages of specific categories.

Connected users—This function will display the currently connected admins, brokers and members with their login, the date of login and their remote IP address. An administrator with the appropriate permissions can disconnect users directly from this page.

Bulk actions—To facilitate user management, the bulk action function allow an administrator to perform actions on entire groupings of users.

Migration tools—These tools facilitate migration of information from other systems to the CASH4MEXICO powered platform. It is possible to import member lists, advertisements, advertisement categories and account information, and to set the initial balance on members' accounts.

Reports & Statistics—With the statistics function it is possible to retrieve more elaborate statistical information with in depth analyses based on dates, time periods or recurrent time frames. Various kinds of developments and activities can be selected and generated in tables and graphs. Reports and Statistics can be displayed directly in the CASH4MEXICO powered platform and most of them have a 'print' and 'download as CSV file' option.

Bookkeeping—The bookkeeping module is commonly used for systems that work with external backing of the internal currency. With this module it is possible to mirror 'external accounts' (e.g. a bank account) in the CASH4MEXICO powered platform and run a 'batch' process on the imported transactions. A batch process can for example generate a system to member payment (buying of units) for every external (incoming) transaction of the type 'deposit'. Before running the batch process an administrator can run a 'simulation' batch to check if the results are correct. The function also facilitates the control of the balance between the external 'backing' account and the system 'loan' account in the CASH4MEXICO powered platform.

Channels—the CASH4MEXICO powered platform can handle requests via various media or "channels." These can be internal CASH4MEXICO powered platform channels like web, PoS or mobile phone. With the channel structure it is possible to add new external (payment) channels to enable access from third party software like e-commerce sites, ATM machines and PoS devices.

Registration agreements—A registration agreement is a text that can show up at the registration page and users who want to register must select a checkbox stating that they agree with this agreement in order to be able to submit. An agreement is a kind of a contract. When a member is moved to a group with a different registration agreement he will have to accept the agreement that is active for the new group.

Security—Because the CASH4MEXICO powered platform can be used for various types of networks it is possible to implement different security levels. The security of the CASH4MEXICO powered platform is on a server (hosting) level and is not within in the scope of this document. The CASH4MEXICO powered platform has some basic security solutions that are always enabled and transparent for the users. For example, passwords are always sent encrypted over the Internet (even if HTTPS is not used) and security measures are implemented to prevent cross site scripting and SQL injects. The CASH4MEXICO powered platform has various system wide security settings like the enabling of HTTPS, expiration times of user sessions, white and black access lists that check on IP and domain names and an optional virtual keyboard for login page and transaction passwords. Thresholds for alerts can be set as well as maximum number of transactions per day. Payment types may also require authorization. There can be various levels of authorization where each level can have its own rules and conditions. Some security configurations are group based. Transaction passwords can be enabled per group and there are many extra password and access policies that can be defined per group.

Help function—The CASH4MEXICO powered platform includes a manual that describes all the functions. In addition to the manual every functionality window has its own help (pop-up) file with an explanation of that function.

All data in the CASH4MEXICO powered platform, even customizations and images, are stored in the database. There is only one simple configuration file outside the CASH4MEXICO powered platform what makes maintenance tasks like backups and upgrades of CASH4MEXICO powered platform considerably easy. The initialization process of the CASH4MEXICO powered platform will always check the versions of the CASH4MEXICO powered platform software and the database. When a new version is installed, the initialization process will upgrade the database automatically. With every new version a changelog is provided with an explanation of all changes and possible new and changed translation files.

The CASH4MEXICO powered platform has a set of web services (APIs) that can be used for communication and integration with other software products or devices.

Figure 9:
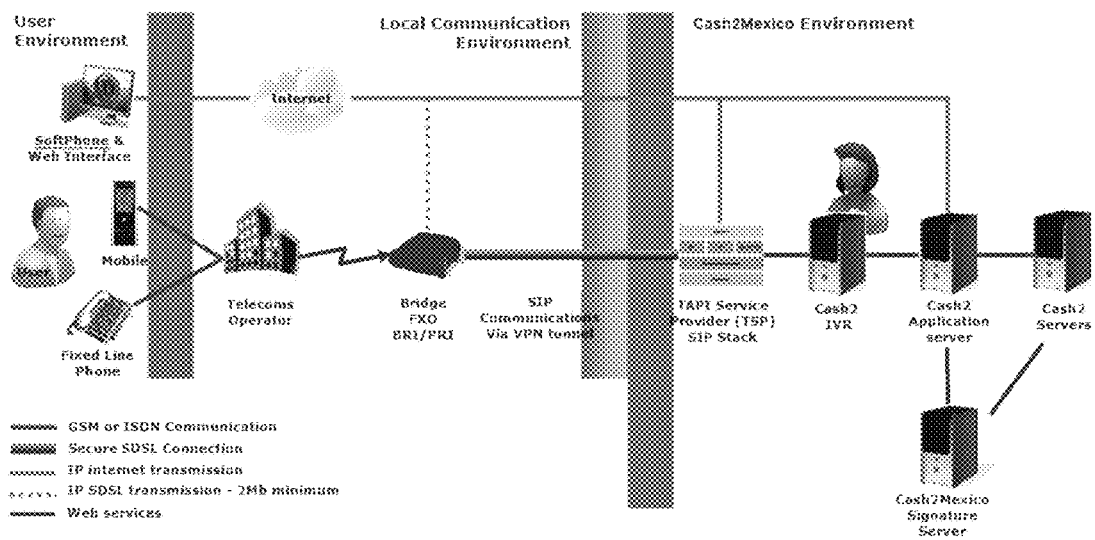
FIG. 9 shows the money transfer architecture with a local communications bridge using data communications, either via Web or mobile.

It should now be apparent that the above-described system allows payments to be made without the need for financial institutions such as banks to get involved with the transactions. See FIG. 9 for complementary information.

The following is an example of money transfer. There are several options that the sender has. Several methods are described, however, the emphasis here is on those methods that do not require the use of a financial institution such as a bank.

- A user in the US will purchase a Call4Mexico/Cash4Mexico top-up card of a specific amount. The card is authenticated by the cashier.
- The user will open the Call4Mexico/Cash4Mexico SIM app in the phone and enter the PIN number provided for in the purchased card.
- The user can indicate whether the top-up is for use with calling minutes or in order to be added to the e-wallet total balance. The user chooses the addition of the funds to her e-wallet.
- If this is the first time the user is transferring money, he will be asked for additional personal information such as
  1. ID, passport, address, phone number
  2. A voice print will also be taken using voice recognition to authenticate money transfer users
- The user then chooses what she wants to do with the funds in the e-wallet. To transfer the money, she chooses the one who is to receive the funds either by
  1. choosing from her contact list
  2. by searching through the contact directory of registered users for the appropriate party
  3. by entering the telephone number, name and additional information about the receiver of the funds depending on the choice of the method of transfer (see next step)

*Note that the receiver of the funds can be a registered user of the service or not. In all cases, a valid mobile telephone number is required.

- The sender is then given a choice of the method of transfer:
  1. Transfer the funds to the receiver's debit card that has been issued for this purpose. The debit card can then be used for retail purchases just like a bank debit card
  2. Transfer the funds to a bank account the information of which the user has already inputted.
  3. Send the funds so they can be physically picked up in the form of cash at a predetermined physical location from an institution that has partnered with the service.

4. Transfer the funds to the e-wallet of the receiver.

What happens next depends on which of the above choices was made and is described in the following sections:

Choice 1—Transfer Funds to a Debit Card

The funds can be transferred as credit to a debit card that can be issued by the invention's service. This debit card will act like a prepaid card with which a user can purchase items using a retailers PoS system just like any other bank debit card.

Choice 2—Transfer Funds to a Bank Account

The funds can be transferred to an existing bank account at any financial institution that the sender chooses. The sender will be prompted to provide any additional required information about the receiver, bank account number and other identification information.

Choice 3—Physical Pickup of Funds in the Form of Cash

The sender can choose to have the receiver pick up the funds in cash from one of many physical locations of partnering organizations within Mexico. This is arguably the option that will most often be chosen. Specifically, if a user chooses this option:

- A code will be sent via text message to the recipient's mobile phone.
- This code is also sent electronically to a local institution or organization that is partnering with the service (local bank, supermarket or convenience store chain for example)
- The user can then go to this institution with the code and their ID and receive the amount in cash.
- The institution is reimbursed electronically for their partnership and gains a percentage of each transaction.

If the receiver is a registered user of the service, the funds can be transferred to their e-wallet and the receiver is informed of the deposit. This option gives the receiver the choice of how to gain access to the funds. The use of these funds can conform to any of the options described above in regard to the E-wallet holder's functions. These can include making payments electronically, providing or obtaining loans or transferring funds to other accounts to name a few.

The foregoing method of money transfer frees the sender and the receiver from the need to be tied to a bank account, or other financial service, with multiple methods of payment and multiple interfaces including connectivity via services available over mobile telephony such Interactive Voice Response (IVR), Voice Recognition, SMS or a mobile app, all without the participation of third party financial institutions.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A method for least cost routing for mobile telephone calls between a country and a foreign country, comprising the steps of:
    pre-establishing a target area code in foreign country; and
    programming a SIM card with computer instructions for carrying out the steps of,
        recognizing that a call to a destination number is being initiated to said target area code,
        completing the call via Voice over IP (VoIP) over a data connection via Session Initiation Protocol (SIP);
        communicating SIP call control information to a local control center including called number, calling number, HLR and VLR information,
    said local control center carrying out the steps of;
        recognizing and authenticating said calling number and terminating and parking said call,
        formulating a call setup request to the called number in said foreign country,
        automatically determining the lowest cost routing option,
        transmitting said routing option to the SIM card application,
        initiating a new call to the destination number via the lowest cost routing option, terminating on the destination number, and
        merging the parked call with the call terminating on the destination number.

2. A platform for transferring money using the method of claim 1, wherein funds are transferred to any one of an electronic wallet, a debit card, a bank account, or a physical location.

* * * * *